United States Patent
Laaksonheimo

(10) Patent No.: US 7,339,343 B2
(45) Date of Patent: Mar. 4, 2008

(54) METHOD FOR CORRECTING SPEED FEEDBACK IN A MOTOR

(75) Inventor: Jyrki Laaksonheimo, Hyvinkää (FI)

(73) Assignee: Kone Corporation, Helsinki (FI)

( * ) Notice: Subject to any disclaimer, the term of this patent is extended or adjusted under 35 U.S.C. 154(b) by 26 days.

(21) Appl. No.: 10/756,380

(22) Filed: Jan. 14, 2004

(65) Prior Publication Data

US 2004/0145335 A1   Jul. 29, 2004

Related U.S. Application Data

(63) Continuation of application No. PCT/FI02/00650, filed on Jul. 31, 2002.

(30) Foreign Application Priority Data

Aug. 1, 2001   (FI) .................................. 20011598

(51) Int. Cl.
   *H02P 7/00* (2006.01)
(52) U.S. Cl. .................... 318/715; 318/138; 318/254; 318/439; 318/700
(58) Field of Classification Search ................ 318/700, 318/715, 254, 439, 138, 560, 609, 737, 561
   See application file for complete search history.

(56) References Cited

U.S. PATENT DOCUMENTS

| | | | | |
|---|---|---|---|---|
| 4,269,286 A | * | 5/1981 | Ishii et al. .................. | 187/292 |
| 4,684,856 A | * | 8/1987 | Kahkipuro ................... | 388/820 |
| 4,914,365 A | * | 4/1990 | Murakami et al. .......... | 318/609 |
| 4,967,128 A | * | 10/1990 | Sawai et al. ................. | 318/609 |
| 5,446,360 A | * | 8/1995 | Son et al. .................... | 318/727 |
| 5,666,034 A | * | 9/1997 | Seoung et al. ................. | 318/6 |
| 5,666,463 A | * | 9/1997 | Schwartz et al. ........... | 388/804 |
| 5,789,880 A | * | 8/1998 | Iwai et al. ................... | 318/116 |
| 5,828,014 A | * | 10/1998 | Goto et al. .................. | 187/292 |

FOREIGN PATENT DOCUMENTS

| | | |
|---|---|---|
| EP | 0 638 988 A | 2/1995 |
| EP | 0 748 038 A | 12/1996 |
| WO | WO 99 28229 A | 6/1999 |

OTHER PUBLICATIONS

Tsai, Ming-Fa et al, "A Transputer-Based Adaptive Speed Controller . . . " IEEE, 1990, pp. 609-516.*
Qian, Weizhe et al, "Torque Ripple Minimization in PM Synchronous motor Using Iterative Learning Control" IEEE, 2003, p. 272-279.*
Bidstrup, Niels et al, "Self-Tuning Speed Regulator for CVC Induction Motor Drive" IEEE, 1994, p. 921-926.*

(Continued)

*Primary Examiner*—Lincoln Donovan
*Assistant Examiner*—Tyrone Smith
(74) *Attorney, Agent, or Firm*—Birch, Stewart, Kolasch & Birch, LLP

(57) ABSTRACT

A method for correcting speed feedback in a drive motor by calculating the averages of speed reference and speed measurement for both downward and upward constant-speed travel and then identifying the gain and zero factors and correcting the measured speed measurement to the correct value.

13 Claims, 2 Drawing Sheets

OTHER PUBLICATIONS

Sozer et al., Proceedings of the 1997 IEEE International Conference on Control Applications, pp. 633-638 (Oct. 5-7, 1997).

Holtz et al., IEEE Transactions on Industry, vol. 27, No. 6, pp. 1111-1118 (1991).

Sepe et al., IEEE Transactions on Industry, vol. 27, No. 4, pp. 706-714 (1991).

Shen et al., IEEE Transactions on Industry, vol. 38, No. 4, pp. 1072-1080 (2002).

* cited by examiner

METHOD FOR CORRECTING SPEED FEEDBACK IN A MOTOR

This application is a Continuation of copending PCT International Application No. PCT/FI02/00650 filed on Jul. 31, 2002, which designated the United States, and on which priority is claimed under 35 U.S.C. § 120, and this Nonprovisional application claims priority under 35 U.S.C. § 119(a) on Patent Application No(s). 20011598 filed in Finland on Aug. 1, 2001, the entire contents of which are hereby incorporated by reference.

BACKGROUND OF THE INVENTION

1. Field of the Invention

The present invention relates to a method for correcting speed feed-back in a synchronous permanent-magnet motor.

2. Description of the Background Art

The problem is that, in the prior art, speed feedback in a synchronous permanent-magnet motor changes slowly e.g. as a function of temperature. When used as an elevator drive machine, the permanent-magnet motor is typically subjected to long-lasting peek-level loads, during which the temperature of the elevator machine rises. As the machine is developing heat, the speed feedback sensor attached to the machine becomes heated. In the present context, the above-mentioned speed feedback sensor is a tachometer. Thus, the speed information obtained from the tachometer changes, e.g. drifts, as a function of the temperature of the machine and especially of the tachometer. In the above-mentioned situation, the speed feedback information typically includes a 3% gain and zero error, which is visible in the entire speed regulation system. A rise in the machine temperature may naturally also be due to development of heat in the elevator shaft when a synchronous permanent-magnet motor is used as an elevator drive motor.

Sensor drift is well known to mean that a sensor output has some error value that varies (drifts) for some reasons, e.g. time, temperature, utilization etc. FIGS. 3a and 3b show an effect of offset drift and gain drift on a sensor output signal. In case of tachometers, offset drift and gain drift are caused, for example, when temperature changes because effective mechanical dimensions of tachometer changes causing drift in output signal, or effective magnetic fields inside tachometer changes causing drift in output signal. Offset drift and gain drift are also caused, for example, when using a tachometer (after installation) because tachometers have brushes (like DC motors), which will wear (mechanically) the more the tachometer is used. Wearing causes changes in electrical contacts and therefore, there will also be a drift in tachometer output signal. If the tachometer is not used regularly, contact elements will become oxidized causing drift. Such wearing effects may take weeks, months, even years in regular elevator use.

When using the tachometer as a servomotor feedback sensor, for example, in elevator systems, there may be up to a 10% error (drift) in a tachometer output signal, mainly because of tachometer gain drift. Both offset drift and gain drift may increase or decrease the tachometer signal (positive or negative drift), this behavior depends on tachometer constructions, manufacturing processes, usage etc. If drift errors are not compensated, the elevator may run slower than designed, it will have problems for stopping at floor stops, there may be oscillations in an elevator drive motor rotation speed, etc.

Previously known solutions attempted in order to deal with the above-mentioned problem by generating an advance estimate of the speed signal error produced in the above-described manner and eliminating the error on an average. However, this method would not lead to accurate and reliable correction of the error.

Another known way of solving the aforesaid problem is based on measurement of speed feedback. In this case, a known distance is traversed at a known speed, so the speed feedback error can be corrected at the operating point in question. The problem with this method is the continuously changing operating point, so the correction is naturally inaccurate.

SUMMARY OF THE INVENTION

It is therefore an object of the present invention to eliminate the abovementioned drawback in static correction of speed feedback.

A specific object of the invention is to disclose a method for continuous correction of speed feedback in a synchronous permanent-magnet motor that is better than prior-art methods.

The method of the invention provides significant advantages as compared with prior art.

The method of the invention allows advantageous correction of non-linearities in the measurement of the speed of a synchronous permanent-magnet motor. A specific object of the invention is to correct the slow drift of speed feedback in the measurement of the speed of a synchronous permanent-magnet motor. This aforesaid drift may occur e.g. in relation to temperature.

Another advantage of the method of the invention is that it is an adaptive method, which means that, once the initial values have been set, the method learns the correct factors. In addition, in the calculation of the parameters to be used in the method, it is possible to include a forgetting factor, which makes it possible to perform the changing of the aforesaid parameters in a controlled manner. Via controlled changing of the above-mentioned parameters, it is possible to achieve some correction of the direction dependence of the zero and gain error.

The present invention concerns a method for correcting speed feedback in a synchronous permanent-magnet motor. In the most preferred embodiment of the invention, the averages of speed reference and speed measurement for constant-speed downward travel are calculated. In a corresponding manner, the average of speed reference and speed measurement for constant-speed upward travel is calculated. Next, the gain and zero factors to be used in the calculation are identified and the measured speed measurement value is corrected to the correct value.

All the above-mentioned averages of speeds are calculated using the sum of the respective speeds and the number of samples. For example, the average of the speeds of downward constant-speed travel is calculated by dividing the sum of the speeds of constant-speed downward travel by the number of samples of downward constant speed. Similarly, the average of the speeds of constant-speed upward travel is calculated by dividing the sum of the speeds of constant-speed upward travel by the number of samples of upward constant speed.

In a preferred embodiment of, the invention, the synchronous permanent-magnet motor of the method is used as an elevator drive machine.

According to the method, the speed gain factor and the speed zero factor are first assigned certain initial values. After this, new speed gain and zero factors are calculated.

According to the invention, the aforesaid speed gain factor and speed zero factor are updated by a forgetting factor. This aforesaid forgetting factor is an exponential factor. This aforesaid forgetting factor is used in the present method so that, by applying the aforesaid forgetting factor, measurement samples of recent history are given more weight as compared with earlier measurement samples.

This forgetting factor is a weighting coefficient that defines how much old data and how much new data is used for calculating a new value for, for example, a tachometer gain factor or zero factor. For example, when calculating the gain factor, the following formula can be utilized:

$$Gn = K*MGn + (1-K)*G_{n-1}$$

wherein Gn is the nth tachometer gain factor (calculated); MGn is the nth measured tachometer gain factor (e.g., new measured sample); $G_{n-1}$ is the previous tachometer gain factor (calculated); and K is the forgetting factor, which can have a value between 0 and 1, for example.

As such, for example, if K=0.1, then 90 percent of the previous data is taken into account and 10 percent of the previous data is forgotten. In other words, by expanding the calculation of G0, G1, etc., the following exponential formulas could be produced:

$$G0 = K*MG0 \text{ (initial)}$$

$$G1 = K*MG1 + (1-K)*G0$$

$$G2 = K*MG2 + (1-k)*G1$$

Then, via substitution, one can see that G2 would be $K*MG2 + (1-k)*K*MG1 + (1-K)^2*K*MG0$.

As can be seen in the above formulas, the older the measured value MGn is, the smaller its weighting coefficient (forgetting factor) becomes, i.e., the history will be slowly forgotten.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
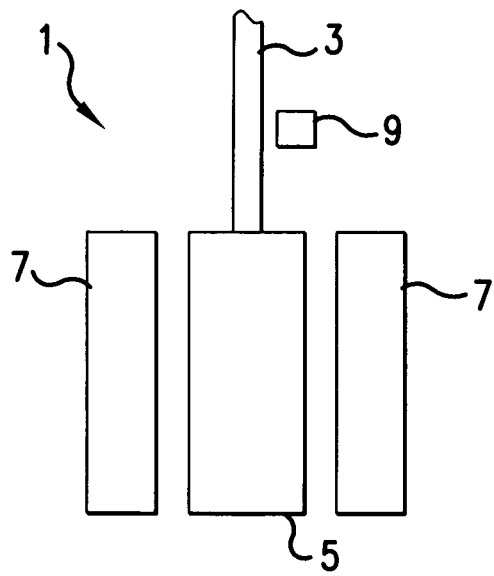
FIG. 1 is an illustrative cross-section of a permanent magnet motor.

FIG. 1 shows a simplified illustration of a permanent magnet motor 1. The permanent magnet motor 1 has a shaft 3 that is fixedly attached to a rotor 5. The rotor 5 is typically a magnet that rotates because of an electrical force generated by windings of a stator 7. The permanent magnet motor 1 also further includes a speed feedback sensor 9 that measures a rotational speed of the permanent magnet motor 1. This speed feedback sensor 9 is shown to be located on the shaft 3 in FIG. 1, however, the speed feedback sensor 9 can also be provided in any suitable location on the permanent magnet motor 1.

Figure 2:
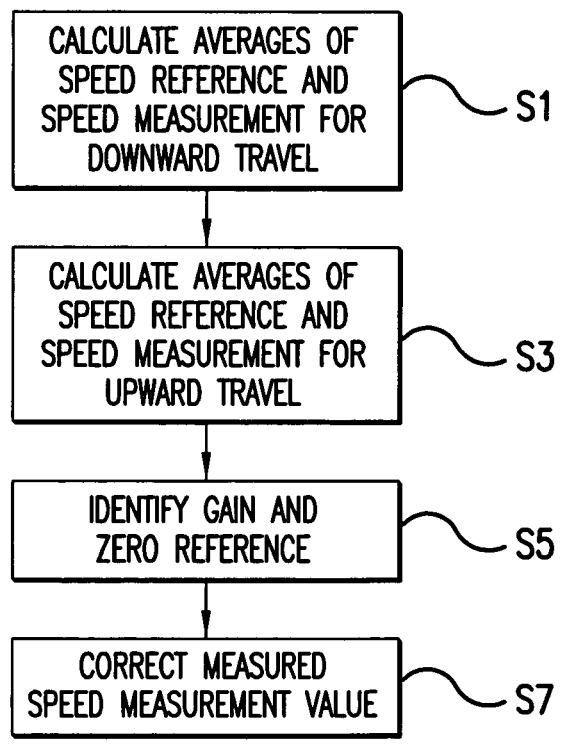
FIG. 2 is a flow chart of a method according to a preferred embodiment of the present invention.
Figure 3A:
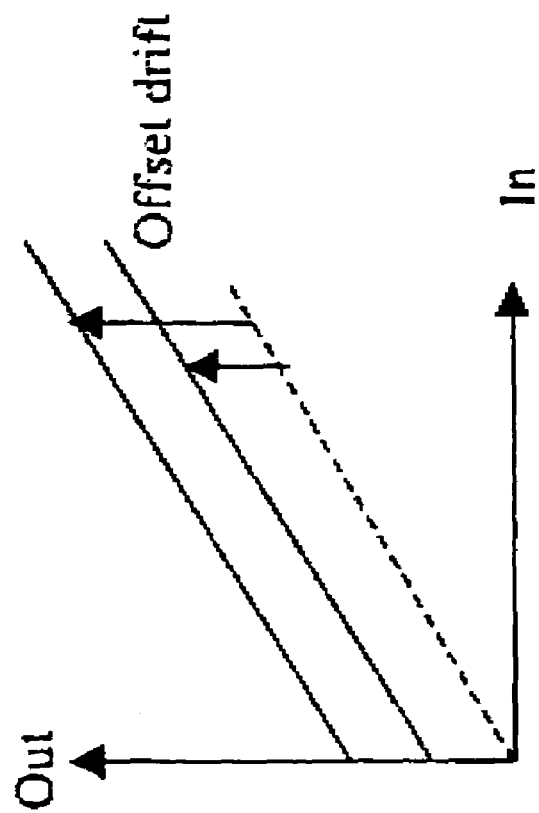
FIGS. 3a and 3b show an effect of offset drift and gain drift on a sensor output signal.
Figure 3B:
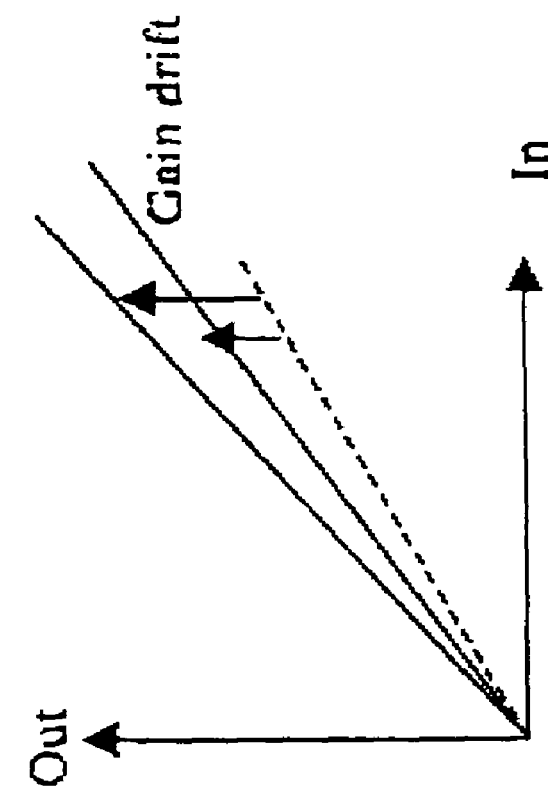

FIG. 2 is a flow chart of a method according to a preferred embodiment of the present invention. In step S1 averages of a speed reference and speed measurement for downward travel is calculated. In step S3 averages of a speed reference and speed measurement for upward travel is calculated. Then, in step S5, the gain and zero factors are identified. Thereafter, in step S7, the measured speed measurement value is corrected on the basis of the identified gain and zero factors.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for correcting speed feedback in a drive motor for imparting accurate upward and downward travel to a load, the steps comprising:

measuring a speed value of the drive motor by a feedback sensor;

provide speed references for upward and downward constant-speed travel;

detecting a plurality of speed measurements for upward constant-speed travel;

detecting a plurality of speed measurements for downward constant-speed travel;

averaging the plurality of speed references and measurements for upward and downward constant-speed travel;

identifying a gain factor from said calculated averages of said speed references and speed measurements for downward and upward constant-speed travel;

identifying a zero factor from said calculated averages of said speed references and speed measurements for downward and upward constant-speed travel; and correcting the measured speed value utilizing said gain and zero factors to compensate for drift in the feedback sensor.

2. The method according to claim 1, wherein the averages of the speed values of speed reference and speed measurement are calculated using a sum of the speed values and a total number of samples of the speed values.

3. The method according to claim 2, wherein the gain factor and zero factor are identified each time the averages of the speed values of speed reference and speed measurement are calculated.

4. The method according to claim 3, wherein the gain factor and zero factor are updated by a forgetting factor.

5. The method according to claim 3, wherein the gain factor and zero factor are updated by an exponential forgetting factor.

6. The method according to claim 4, wherein, by applying the forgetting factor, measurement samples of recent history are weighted greater than earlier measurement samples.

7. The method according to claim 1, wherein the method is adaptive to continuously update parameters for correcting said measured speed value.

8. The method according to claim 1, wherein the drive motor is operatively incorporated as part of an elevator drive machine.

9. An apparatus for correcting measured speed feedback, the apparatus comprising:
- a measuring unit for measuring a speed value of a drive motor;
- a calculating unit for calculating averages of a speed reference and a speed measurement from the measured speed value;
    - wherein the averages of a speed reference and a speed measurement are determined by detecting a plurality of speed measurements for upward constant-speed travel, detecting a plurality of speed measurements for downward constant-speed travel, and averaging the plurality of speed references and measurements for upward and for downward constant-speed travel;
- an identifying unit for identifying a gain factor and a zero factor;
    - wherein the identifying unit identifies the gain factor from said calculated averages of said speed references and speed measurements for downward and for upward constant-speed travel;
    - and wherein the identifying unit also identifies a zero factor from said calculated averages of said speed references and speed measurements for downward and for upward constant-speed travel; and
- a correcting unit for compensating a drift in the measuring unit, the correcting unit compensating for the drift on the basis of the average of the speed reference, the average of the speed measurement, the identified gain factor, the identified zero factor, and on the basis of a forgetting factor;
    - wherein the forgetting factor is a constant value that may be set to any value between 0 and 1 such as to vary the speed of forgetting.

10. The method of claim 1, wherein the drive motor is a synchronous permanent magnet drive motor.

11. The method of claim 1, wherein the sensor is a tachometer.

12. The apparatus of claim 9, wherein the drive motor is a synchronous permanent magnet drive motor.

13. The apparatus of claim 9, wherein the sensor is a tachometer.

* * * * *